United States Patent
Harada et al.

(10) Patent No.: US 6,913,709 B2
(45) Date of Patent: Jul. 5, 2005

(54) LIQUID CRYSTALLINE GEL COMPOSITION, AND DISPLAY MEDIUM, DISPLAY DEVICE AND DISPLAY BODY USING SAME

(75) Inventors: Shigeyuki Harada, Shizuoka-ken (JP); Takuzo Aida, Tokyo (JP); Woo-Dong Jang, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 118 days.

(21) Appl. No.: 10/379,906

(22) Filed: Mar. 6, 2003

(65) Prior Publication Data

US 2003/0222242 A1 Dec. 4, 2003

(30) Foreign Application Priority Data

Mar. 6, 2002 (JP) ........................ 2002-060958

(51) Int. Cl.⁷ ................ C09K 19/52; C09K 19/54; G11B 7/24; G02F 1/13
(52) U.S. Cl. ............... 252/299.01; 252/299.5; 428/1.1; 428/1.5; 349/2; 430/270.11; 516/900
(58) Field of Search ........................ 252/299.01, 299.5; 428/1.1, 1.5; 430/270.11; 516/900; 349/2

(56) References Cited

U.S. PATENT DOCUMENTS

| | | | | |
|---|---|---|---|---|
| 6,074,710 A | * | 6/2000 | Kato et al. | 428/1.5 |
| 6,333,081 B1 | * | 12/2001 | Horikiri et al. | 428/1.1 |
| 6,400,492 B1 | | 6/2002 | Morita et al. | |
| 6,645,577 B2 | * | 11/2003 | Horikiri | 428/1.1 |
| 6,682,787 B2 | * | 1/2004 | Kato et al. | 428/1.5 |
| 6,740,255 B2 | * | 5/2004 | Kato et al. | 252/299.01 |

FOREIGN PATENT DOCUMENTS

| | | |
|---|---|---|
| JP | 11-52341 | 2/1999 |
| JP | 11-256164 | 9/1999 |
| JP | 2000-239663 | 9/2000 |
| JP | 2000-305087 | 11/2000 |
| JP | 2001-21924 | * 1/2001 |

* cited by examiner

Primary Examiner—Shean C. Wu
(74) Attorney, Agent, or Firm—Oblon, Spivak, McClelland, Maier & Neustadt, P.C.

(57) ABSTRACT

A liquid crystalline gel composition including a liquid crystalline compound, and a gelling agent having a structural unit represented by the following formula (1):

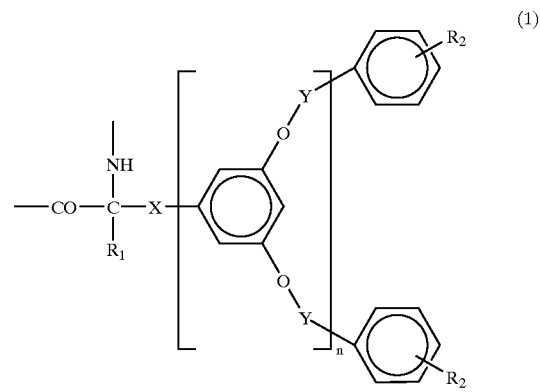

wherein $R_1$ represents a hydrogen atom or an organic group having at least one carbon atom, X represents a divalent organic group having at least one carbon atom, Y represents a divalent hydrocarbon group having at least one carbon atom, $R_2$ represents a hydrogen atom or an organic group having at least one carbon atom, and n is an integer of at least 1. A display medium including a pair of substrates each having an electrode thereon, and a layer of the above liquid crystalline gel composition interposed between the pair of substrates.

26 Claims, 3 Drawing Sheets

LIQUID CRYSTALLINE GEL COMPOSITION, AND DISPLAY MEDIUM, DISPLAY DEVICE AND DISPLAY BODY USING SAME

BACKGROUND OF THE INVENTION

The present invention relates to a liquid crystalline gel composition, a display medium, a display device and a display body using the liquid crystalline gel composition.

Various types of liquid crystal display elements have been proposed and put into practical use. A typical one is a (S)TN liquid crystal display element comprising a twisted liquid crystal molecular layer and a pair of polarizing plates for sandwiching the liquid crystal molecular layer. This type of liquid crystal display element uses polarizing plates (and a color filter in the case of a color display) and thus needs a strong backlight to provide a bright display. In view of power consumption and brightness, reflective (S)TN liquid crystal display elements and liquid crystal display elements having no polarizing plate have been proposed.

One typical display element having no polarizing plate is a polymer dispersion liquid crystal (PDLC) element. A PDLC element has a light control layer comprising a matrix of a polymer and an anisotropic liquid crystal having a positive dielectric constant and a refractive index similar to that of the polymer of the matrix and dispersed in the matrix in the form of droplets with a diameter of a few microns, and makes a display using the difference in the refractivity between the polymer matrix and the liquid crystal. When no voltage is applied, the liquid crystal molecules are not aligned. Thus, there is a difference in the refractivity between the polymer matrix and the liquid crystal droplets, and light which enters the light control layer is scattered. When a voltage is applied, the liquid crystal molecules are aligned in the direction of the voltage. Thus, the polymer matrix and the liquid crystal droplets have the substantially same refractivity, and light which enters the light control layer passes therethrough.

As another typical display element having no polarizing plate, elements having a light control layer of a liquid crystalline gel are proposed (Japanese Laid-Open Patent Publication No. H11-052341, Japanese Laid-Open Patent Publication No. H11-256164, Japanese Laid-Open Patent Publication No. 2000-239663 and Japanese Laid-Open Patent Publication No. 2000-305087). A liquid crystalline gel is a gel substance which exhibits liquid crystallinity obtained by eliminating the fluidity of a liquid crystalline compound which has fluidity by nature.

The display element disclosed in Japanese Laid-Open Patent Publication No. H11-052341 uses a compound having molecules each having at least two groups capable of intermolecular hydrogen bonding and at least two alkylene groups as a gelling agent to obtain a display element with high contrast which can be produced by a simple process as compared with conventional polymer dispersion liquid crystal elements. In the publication, a method in which a light control layer is formed by air drying a solution comprising a liquid crystal, the gelling agent and an organic solvent in a draft is shown. Certainly, the purpose of simplifying the production process is accomplished.

Japanese Laid-Open Patent Publication No. H11-256164 discloses a gel substance comprising a liquid crystalline compound and a gelling agent containing a divalent organic group having a skeleton represented by —NH—CH(—R)—CO—, and a display element using the gel substance. More specifically, a TN element comprising a pair of ITO electrodes, polyimide orientation films provided on the electrodes and subjected to rubbing treatment and a light control layer of the gel substance sandwiched between the electrodes is shown. The TN cell is excellent in responsiveness to an electric field as compared with a TN element using a non-gelled liquid crystalline compound.

According to Japanese Laid-Open Patent Publication No. 2000-239663, there is provided a display device having a light control layer of a liquid crystalline gel which exhibits a nematic, smectic or chiral smectic phase, or a ferroelectric or anti-ferroelectric liquid crystalline gel which exhibits a smectic or chiral smectic phase. The element has high stability and high shock resistance.

In Japanese Laid-Open Patent Publication No. 2000-305087, a method for applying a liquid crystalline composition containing a liquid crystalline compound and a gelling agent between a pair of substrate having subjected to orientation treatment such that the gelling agent is aligned in parallel or perpendicular to the orientation treatment direction for the purpose of improving switching properties and contrast and providing a gray scale display.

The PDLC element utilizing light scatter due to a difference in refractivity does not need a polarizing plate but has a low scattering amplitude. Thus, it cannot provide a display with high brightness and contrast. The light scattering element disclosed in Japanese Laid-Open Patent Publication No. H11-052341 is not in a satisfactory level in contrast as in the case with the PDLC element. The display element disclosed in Japanese Laid-Open Patent Publication No. H11-256164 has a low light transmissivity when no voltage is applied and thus cannot have sufficient contrast. The light scattering element and TN element disclosed in Japanese Laid-Open Patent Publication No. 2000-239663 cannot provide contrast for high visibility.

The element made by the method of Japanese Laid-Open Patent Publication No. 2000-305087 can smoothly switch the orientation of the liquid crystal molecules from horizontal to vertical but is not in a satisfactory level in contrast as in the case with the above elements.

SUMMARY OF THE INVENTION

The present invention has been made to overcome the above problems and it is, therefore, an object of the present invention to provide a liquid crystalline gel composition suitable to a display device capable of providing a display with excellent visibility and high contrast. Another object of the present invention is to provide a display medium, a display device and a display body using the liquid crystalline gel composition.

According one aspect of the present invention, there is provided a liquid crystalline gel composition comprising a liquid crystalline compound, and a gelling agent having a structural unit represented by the following formula (1):

(1)

wherein $R_1$ represents a hydrogen atom or an organic group having at least one carbon atom, X represents a divalent organic group having at least one carbon atom, Y represents a divalent hydrocarbon group having at least one carbon atom, $R_2$ represents a hydrogen atom or an organic group having at least one carbon atom, and n is an integer of at least 1.

In another aspect, the present invention provide a display medium comprising a pair of substrates each having an electrode thereon, and a layer of the above liquid crystalline gel composition interposed between said pair of substrates.

The present invention also provides a display device comprising the above display medium and a switching element capable of applying an electric field to the display medium according to an image signal.

In a further aspect, the present invention provides a display body comprising the above display medium or display device.

BRIEF DESCRIPTION OF THE DRAWINGS

Other objects, features and advantages of the present invention will become apparent from the detailed description of the preferred embodiments of the invention which follows, when considered in light of the accompanying drawing, in which.

DETAILED DESCRIPTION OF THE PREFERRED EMBODIMENTS OF THE INVENTION

The liquid crystalline gel composition according to the present invention uses a gelling agent having a structural unit represented by the following formula (1):

wherein $R_1$ represents a hydrogen atom or an organic group having at least one carbon atom, preferably 1 to 20 carbon atoms, X represents a divalent organic group having at least one carbon atom, preferably 1 to 20 carbon atoms, Y represents a divalent hydrocarbon group having at least one carbon atom, preferably 1 to 20 carbon atoms, $R_2$ represents a hydrogen atom or an organic group having at least one carbon atom, preferably 1 to 20 carbon atoms, and n is an integer of at least 1.

When the gelling-agent having a structural unit represented by the formula (1) is mixed with a liquid crystalline compound, the fluidity of the liquid crystalline compound is lost to form a gel. The gelling agent is considered to form a fibrous aggregate by intermolecular interaction by hydrogen bonding and van der Waals force with the —CO—C($R_1$)—NH— groups serving as cores to which branched portions containing —Ph(OY—)$_2$, where Ph represents phenyl, are connected to form a three-dimensional self-assembled structure, so that the composition containing the liquid crystalline compound and the gelling agent forms a gel. The branched portion has a function of aiding the hydrogen bonding between the cores and thus is an essential element as a structural unit. From the standpoint of gel formation, therefore, the number n is desired to be large. However, as n is larger, the number of preparation steps increases. Thus, n is preferably 2 to 4.

The linking group Y in the branched portion is not specifically limited as long as the branched portion can create a three-dimensional structure. Namely, the branched portion preferably does not have such a structure that the branches of the branched portion are folded at the linking groups Y toward the core. Thus, the linking group Y is preferably an alkylene group having 1 to 8 carbon atoms.

The substituent $R_2$ is preferably a non-hydrogen bonding group such as an alkyl group, alkoxy group, alkyl ether group or alkyl ester group, preferably having 1–8 carbon atoms. When a hydrogen bond-forming group exists in the branched portion, the branched portion may undesirably form a hydrogen bond with the core.

The substituent $R_1$ in the core is not specifically limited as long as it does not sterically hinder the hydrogen bonding properties of the core. Preferably, $R_1$ is a hydrogen atom in view of easiness of preparation.

The divalent organic group X is preferably an alkylene having 1–8 carbon atoms or an arylene group having 6–12 carbon atoms. The alkylene and arylene group may have one or more substitutent. Preferred example of the divalent organic group X includes a methylene group.

The liquid crystalline gel composition can be obtained by preparing a hot solution of a crystalline compound and the gelling agent, and cooling the solution to room temperature (the solution may be thereafter allowed to stand for a long time if necessary) or applying ultrasonic waves to the hot solution. The hot solution of the liquid crystalline compound and the gelling agent can be obtained by adding the gelling agent to the liquid crystalline compound and heating the mixture with stirring, or by dissolving the gelling agent into a solvent which can dissolve the gelling agent at room temperature or at an elevated temperature and adding the solution to the liquid crystalline compound heated.

The orientation of liquid crystalline molecules in the self-organized liquid crystalline gel composition can be controlled, so that the liquid crystalline composition exhibits an excellent electro-optic effect. In the present invention, any liquid crystalline compound used in conventional liquid crystal elements, such as a nematic liquid crystal, smectic liquid crystal, cholesteric liquid crystal, ferroelectric liquid crystal, anti-ferroelectric liquid crystal, or ferri-ferroelectric liquid crystal, can be used.

The amount of the gelling agent varies with the kind of the liquid crystalline compound. Generally, the gelling agent is used at least in the minimum amount required to gel the liquid crystalline compound, more preferably 1.1 to 3.0 times as much as the minimum amount, most preferably 1.2 to 1.8 times as much as the minimum amount. A display medium of the present invention comprises a layer of the liquid crystalline gel composition disposed between a pair of substrates each having an electrode.

The substrates are transparent or colored glass plates or plastic films which may be rigid or flexible. At least one of the substrates must be transparent. The thickness of the substrates is about 10 $\mu$m to 1 mm, preferably 25 to 200 $\mu$m. The electrodes comprise transparent or colored conductive films of, for example, a metal, ITO, SnO, ZnO or Al. At least the electrode on the side of the transparent substrate must be transparent. The electrodes can be formed by sputtering, vacuum deposition, CVD or coating. The electrodes may be patterned into stripes, for example, according to the method for driving the liquid crystal.

When necessary, an orientation film may be provided on each of the electrodes by any suitable method, such as physical absorption, chemical absorption, plasma polymerization or deformation orientation treatment, to improve and control the orientation of the liquid crystal molecules. The orientation films may be subjected to orientation treatment such as rubbing treatment.

The display medium of the present invention may be prepared by a method which includes the steps of applying a solution of the liquid crystalline gel composition on one of the substrates with a coater such as a bar coater, roll coater, gravure coater, or spin coater, gelling the liquid crystalline gel composition by cooling, and bonding the substrate to the other, counter substrate, or a method which comprises the steps of bonding the paired substrates with a spacer being interposed therebetween, injecting a solution of the liquid crystalline gel composition between the substrates, and gelling the liquid crystalline gel composition by cooling.

A display device of the present invention comprises the above display medium and a switching element capable of applying an electric field to the display medium according to an image signal.

The switching element is an element for driving liquid crystal. In the present invention, a two-terminal element such as a diode element, MIM (metal insulator metal) element, or ZnO varistor element; or a three-terminal element using a CdSe TFT (thin film transistor), a-Si TFT (non-crystalline silicon TFT) p-Si TFT (polycrystalline silicon TFT) or the like may be suitably used. Especially, a TFT element is preferred since a large-area thin film element can be easily formed.

A display device of the present invention may further comprise holding means for holding a state, such as orientation, of the liquid crystalline gel composition formed by the switching element. The holding means may be of a type which utilizes the memory property of a ferroelectric substance in a polarized state to hold the liquid crystal molecules in an oriented state formed by the switching element. As the holding means, a capacitor of a ferroelectric insulating film or a capacitor comprising a ferroelectric insulating film and a paraelectric insulating film can be used.

The display medium and the display device of the present invention may have a protective layer for protecting the display surface of the substrate from physical or chemical damages and maintaining the visibility thereof.

The protective layer is formed by applying a protective layer composition containing a protective layer material on the display surface of the substrate by a coating method such as wire bar coating, roll coating, blade coating, dip coating, spray coating, spin coating or gravure coating, sputtering or a gas phase method such as a chemical gas phase method. The protective layer composition may also contain a medium which dissolve, disperse, suspend or emulsify the protective layer material, a curing agent, a catalyst and/or a promoter. The thickness of the protective layer, which is preferably as thin as possible as long as it has a function of protecting the substrate, is about 0.1–100 $\mu$m, preferably 0.3–30 $\mu$m.

The protective layer material may be polyethylene, polypropylene, polystyrene, polyvinyl chloride, polyvinylidene chloride, a vinyl-chloride-vinyl acetate copolymer, polyvinyl butyral, polyvinyl alcohol, polyethylene oxide, polypropylene oxide, an ethylene-vinyl alcohol copolymer, polyacetal, an acrylic resin, methyl cellulose, ethyl cellulose, a phenol resin, a fluororesin, a silicone resin, a diene resin, a polystyrene based thermoplastic elastomer, a polyolefin based thermoplastic elastomer, a polyurethane based thermoplastic elastomer, a polyester based thermoplastic elastomer, polyphenylene ether, polyphenylene sulfide, polyether sulfone, polyether ketone, polyarylate, aramid, polyimide, poly-p-phenylene, poly-p-xylene, poly-p-phenylenevinylene, polyhydantoin, polyparabanic acid, polybenzimidazole, polybenzothiazole, polybenzoxadiazole, polyquinoxaline, a thermoplastic resin, an active energy ray-curing resin or a mixture thereof.

The display medium and the display device of the present invention may further comprise a print layer provided on at least a part of the display surface of the substrate and/or on at least a part of the protective layer, a print protective layer provided on the print layer, and/or an information recording part.

The print layer may be formed by a known printing method such as offset printing, gravure printing or screen printing depending on the usage of the display device.

The print protective layer may be formed by a known method as in the case with the print layer. The print protective layer may be provided on the protective layer.

The information recording part may be a recording medium on which information is magnetically written and from which that information can be read, an integrated circuit memory, a non-contact integrated circuit memory, an optical memory, or a transparent recording medium from which information can be optically read. The information stored in the information recording part is information indicating the front and back sides of the display medium or the display device and/or the location thereof.

A recording medium on which information is magnetically written and from which that information can be read, an integrated circuit memory, a non-contact integrated circuit memory, or an optical memory for use in the present invention may be produced with conventional recording technology.

A transparent recording means from which information can be optically read for use in the present invention is a read-only memory in which information is saved once and can never be altered unlike the above recording part and made of a near infrared fluorescent material or ultraviolet fluorescent material.

The recording part is not affected by a magnetic field for driving the liquid crystal, so that the display medium and the display device of the present invention can be used as a recording medium having both reversible and non-reversible information recording parts by combining image information formed by the liquid crystalline gel composition and information displayed on the transparent recording part.

The display medium and the display device of the present invention can be used in various forms of display bodies partially or entirely composed of it.

For example, when the display medium or the display device constitutes a part or the whole of a small-size card like a business card or a credit card, a card with excellent portability in which information can be changed can be obtained. Such a card can be used for various types of point cards or membership cards. When the size is enlarged, reversible display sheets which can be used as substitutes for displays or recording sheets (output sheets for copying machines and printers) used in ordinary offices can be produced. Such a reversible sheet can be used repeatedly and thus is an excellent display medium from a viewpoint of resource and energy saving. When incorporated in machines and devices including home appliances, the display medium or the display device of the present invention can provide information in place of a conventional liquid crystal monitor. The display medium and the display device of the present invention can be applied to various types of advertising media and sign boards. In this case, the entire surface of an advertising medium or sign board may be formed of the display medium or the display device, or the display medium or the display device may be incorporated in an advertising medium or sign board as a part thereof to provide an effective display.

The display medium and the display device of the present invention can have flexibility depending upon the constitution. Thus, the display medium and the display device of the present invention can be used for various applications including the cards, sheets, displays, advertising media and sign boards described as above without limitation on configuration.

The following examples will further illustrate the present invention.

REFERENTIAL EXAMPLE 1

Synthesis of Gelling Agent

A dendron monomer was synthesized according to the following scheme:

wherein TBDMSCl and TBDMS represent a t-butoxydimethylchlorosilane group and a t-butoxydimethylsilyl group, respectively.

Then, dendoron (MeO$_2$C)L2-Br, (MeO$_2$C)L3-Br and (MeO$_2$C)L4-Br were obtained according to the following reaction scheme:

(MeO$_2$C)L2—Br (MeO$_2$C)L4—Br ←(b)— ←(a)— (MeO$_2$C)L3—OH (MeO$_2$C)L3—Br

In the above reaction scheme, 18-C-6 and PPh$_3$ represent 18-crown-6-ether and triphenylphosphine, respectively.

Each of the dendoron (MeO$_2$C)L2-Br, (MeO$_2$C)L3-Br and (MeO$_2$C)L4-Br was reacted with t-Boc-(L)-Tyr-(L)-Ala to give a gelling agent G1 (a compound having a structural unit represented by the formula (1), in which R$_1$ is H, R$_2$ is —COOCH$_3$, X is —CH$_2$-p-Ph-O—CH$_2$— where -p-Ph- represents a phenylene group, Y is —CH$_2$—, and n is 1), a gelling agent G2 (a compound having a structural unit represented by the formula (1), in which R$_1$ is H, R$_2$ is —COOCH$_3$, X is —CH$_2$-p-Ph-O—CH$_2$— where -p-Ph- represents a phenylene group, Y is —CH$_2$—, and n is 2) and a gelling agent G3 (a compound having a structural unit represented by the formula (1) in which R$_1$ is H, R$_2$ is —COOCH$_3$, X is —CH$_2$-p-Ph-O—CH$_2$— where -p-Ph- represents a phenylene group, Y is —CH$_2$—, and n is 3).

EXAMPLE 1

The gelling agent G2 (15.0 mg) and 1.00 g of a nematic liquid crystal, MX1543 (made by Merck Ltd., Japan) were charged in a 5 ml vessel and heated with stirring until the gelling agent was dissolved in the liquid crystal to obtain a transparent isotropic solution. The vessel containing the solution was immersed in a tank of an ultrasonic wave generator and irradiated with ultrasonic waves for about one minute. The vessel was then taken out of the water tank and allowed to stand still for about three hours, thereby obtaining a liquid crystalline gel composition without fluidity.

Figure 1:
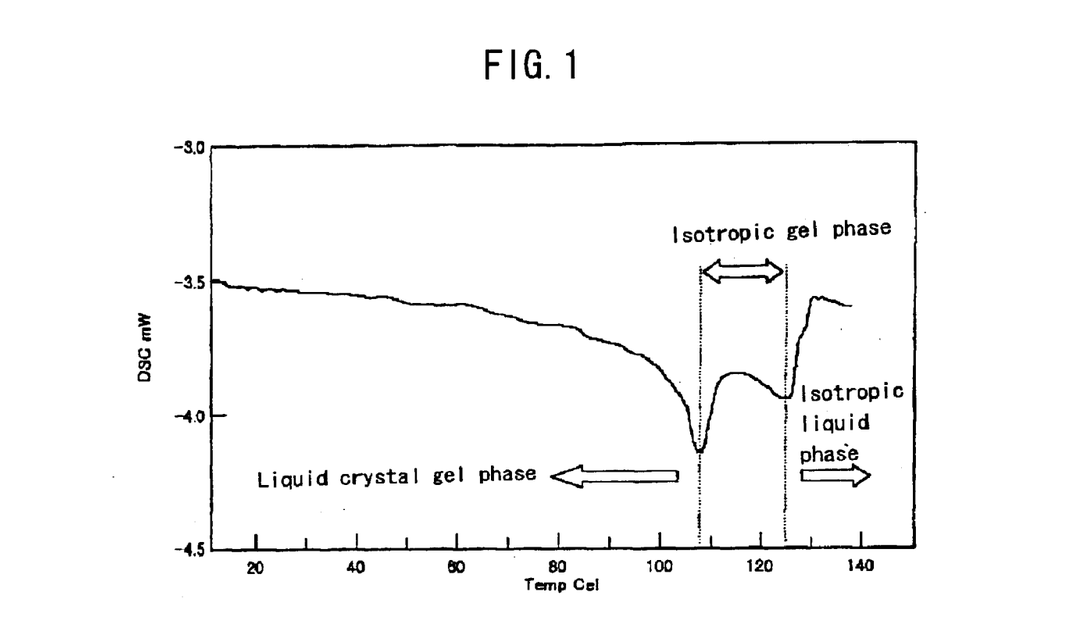
FIG. 1 is a DSC curve showing the phases of a liquid crystalline gel composition of the present invention.

While raising the temperature of the liquid crystalline gel composition from 10° C. at a rate of 5° C./min, the phase changes thereof were observed with a polarization microscope and a differential scanning calorimeter (DSC). The results are shown in FIG. 1. The liquid crystalline gel composition was in a liquid crystalline gel phase up to about 105° C., then exhibited an isotopic phase and had fluidity from about 125° C. Thus, it was proved that the liquid crystalline gel composition exhibits a liquid crystalline gel phase up to 105° C., a gel phase between about 105–125° C., and an isotopic liquid phase at about 125° C. or higher.

EXAMPLE 2

The gelling agent G3 (51 mg) and 1.00 g of 4-cyano-4'-n-pentylbiphenyl (made by Tokyo Kasei Kogyo Co., Ltd.) were charged in a 5 ml vessel and heated with stirring until the gelling agent was dissolved in the liquid crystal to obtain a transparent isotropic solution. The vessel containing the solution was allowed to stand quiescently for about three hours, thereby obtaining a liquid crystalline gel composition without fluidity.

EXAMPLE 3

Two transparent glass substrates with a thickness of 3 mm, each having a surface on which a transparent electrode of ITO was provide by a sputtering method, were prepared. An orienting agent, AL1254 (made by JSR corporation, density: 2.5%) was applied on the electrode surface of each of the substrates. The coating was dried at 80° C. for one minute and then aged at 180° C. for five minutes to form an orientation film, which was then subjected to a rubbing treatment. The thus obtained substrates were opposed to each other with an inner space with a distance of about 18 μm between the electrodes formed by a resin spacer such that the rubbing directions on the substrates are perpendicular to each other, thereby obtaining a display cell.

A liquid crystalline gel composition prepared in the same manner as in Example 2 except that 27 mg of the gelling agent G2 was used was reheated and a thus obtained transparent solution was charged in the inner space of the display cell. The cell was allowed to stand for about 12 hours and sealed with an adhesive, thereby obtaining a display medium.

Comparative Example 1

A display medium was prepared in the same manner as that in Example 3 except that 10.3 mg of N-carbobenzyloxy-L-valylaminooctadecane were used as the gelling agent.

EXAMPLE 4

Figure 2:
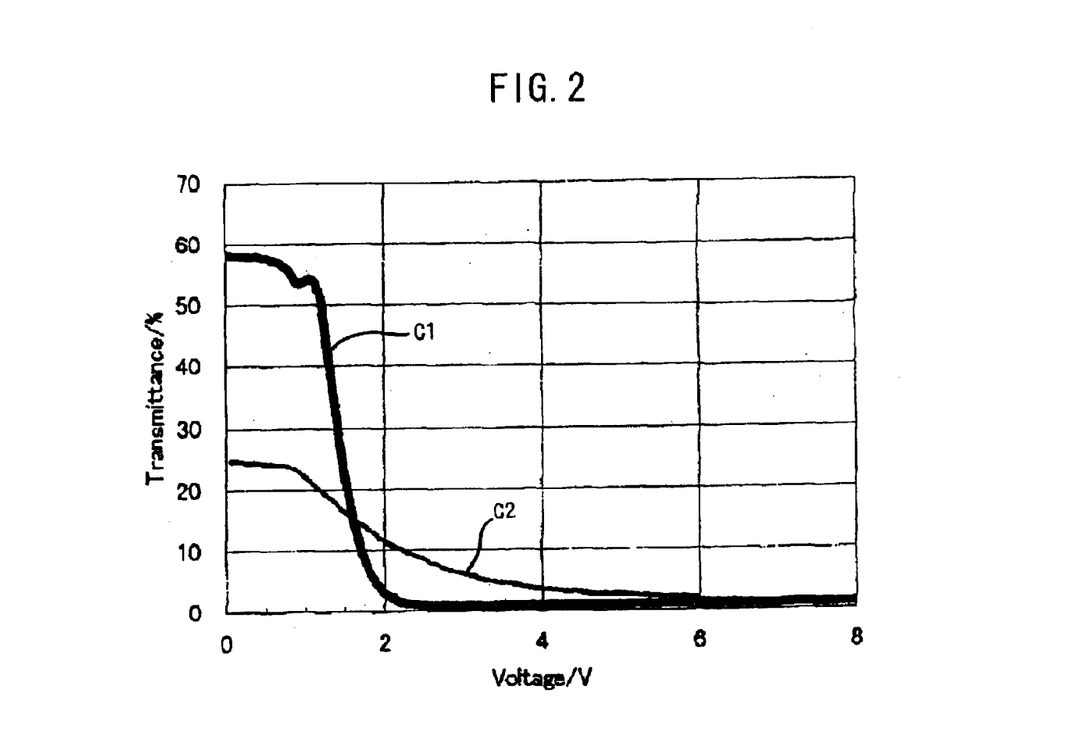
FIG. 2 is a graph showing the relationship between the voltage applied to liquid crystalline gel compositions and the light transmissivity thereof.

The display media prepared in Example 3 and Comparative Example 1 were used. Two polarizing plates and the display medium were set in an LCD evaluation system (LCD-5000, manufactured by Otsuka Electronics Co., Ltd.) such that the rubbing directions on the substrates were parallel to the polarizing of the polarizing plate. While increasing the apply voltage by 0.05 V at a time, the light transmissivity of the display medium at each voltage was measured. The thus obtained relation between the voltage and the light transmissivity is shown in FIG. 2. The curves C1 and C2 are the results obtained using the display media prepared in Example 3 and Comparative Example 1, respectively. Also, the driving voltage and contrast ratio of the display media were obtained as follows.

Driving Voltage

The light transmissivity ($T_0$) of the display medium as measured when no photo voltage was applied thereto was defined as 100%, and the light transmissivity ($T_{100}$) of the display medium as measured when the change in light transmissivity stopped was defined as 0%. Then, an apply voltage $V_{100}$ necessary to obtain a light transmissivity of 90% (decreased by 10%) and an apply voltage $V_{10}$ necessary to obtain a light transmissivity of 10% (decreased by 90%) were measured.

Contrast Ratio

The display device was placed between the light source and the right receiving part with a polarizing plate. The light transmissivity of the display medium as measured when the light source was on was defined as 100%, and the light transmissivity of the display medium as measured when the light source was off was defined as 0%. The light transmissivity $T_{90}$ at the time when a voltage of $V_{90}$ was applied thereto and the light transmissivity $T_0$ at the time when the change in light transmissivity stopped were measured. Then, contrast ratios $T_0/T_{90}$ and $T_0/T_{100}$ were calculated.

The results are summarized in Table 1. As is clear from the results, the display medium comprising the crystalline gel composition of the present invention can be driven by a lower voltage and display an image with a higher contrast ratio than a conventional display medium can.

TABLE 1

| Display medium | Driving voltage [V] | | Contrast ratio | |
| --- | --- | --- | --- | --- |
| | $V_{10}$ | $V_{90}$ | $T_0/T_{90}$ | $T_0/T_{100}$ |
| Example 3 | 1.2 | 1.8 | 8.7 | 58.9 |
| Comp. Example 1 | 1.0 | 3.9 | 6.6 | 17.8 |

EXAMPLE 5

Figure 3:
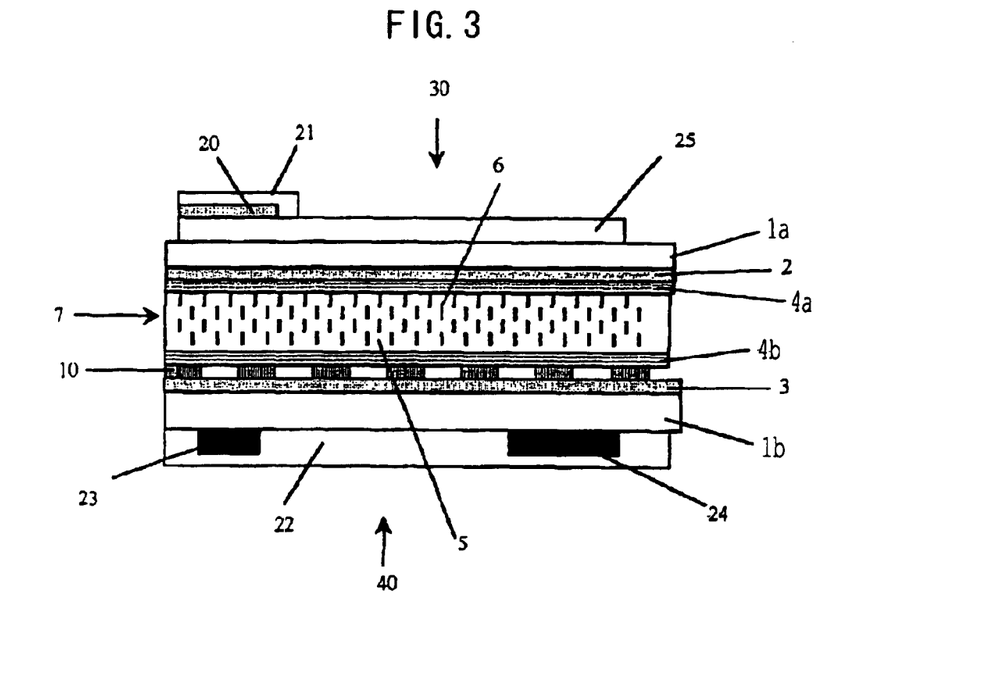
FIG. 3 is a cross-sectional view schematically illustrating an example of a display device according to the present invention.

Example 5 will be described with reference to FIG. 3. A counter electrode 2 of ITO was provided on a surface of a substrate 1a on the side of the display surface 30 by sputtering, and an orientation film 4a was formed on the counter electrode 2 by spin coating. On the other side surface of the substrate 1a was coated a protective layer 25. A print layer 20 and a print protective layer 21 were provided in succession on the protective layer 25.

On a substrate 1b on the side of non-display surface 40, a second protective layer 22 was provided after a magnetic recording medium 23 and an integrated circuit 24 had been bonded thereon. On the other side surface of the substrate 1b, a pixel electrode 3 of ITO having a pattern corresponding to the configuration of a switching element 10 was provided. On the switching element 10 on the pixel electrode 3, an orientation film 4b was provided through an insulating layer. The orientation film 4b was subjected to rubbing treatment with a rubbing device. On the orientation film 4a of the substrate 1a, a solution of a liquid crystalline gel composition comprising a liquid crystal and a gelling agent of the present invention was applied. The substrate 1a was allowed to stand still for 12 hours to render the liquid crystalline gel composition into gel form, thereby forming a display layer 7. The substrate 1b on which the orientation film 4b, the switching element 10 and the pixel electrode 3 had been provided was bonded on the thus obtained display layer 7, thereby obtaining a display device.

EXAMPLE 6

Figure 4:
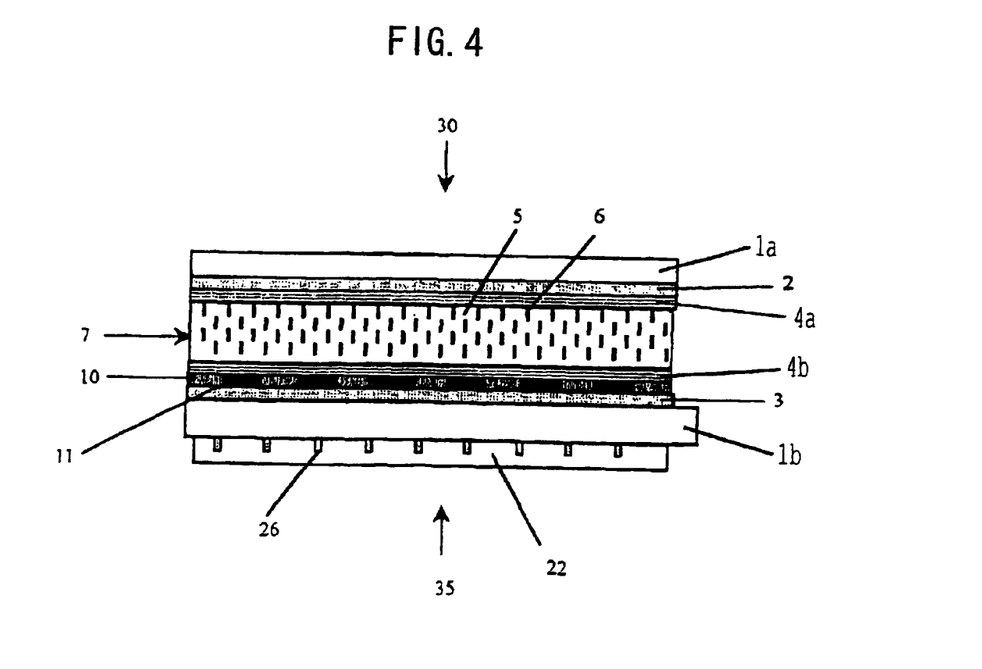
FIG. 4 is a cross-sectional view schematically illustrating another example of a display device according to the present invention.
Figure 5:
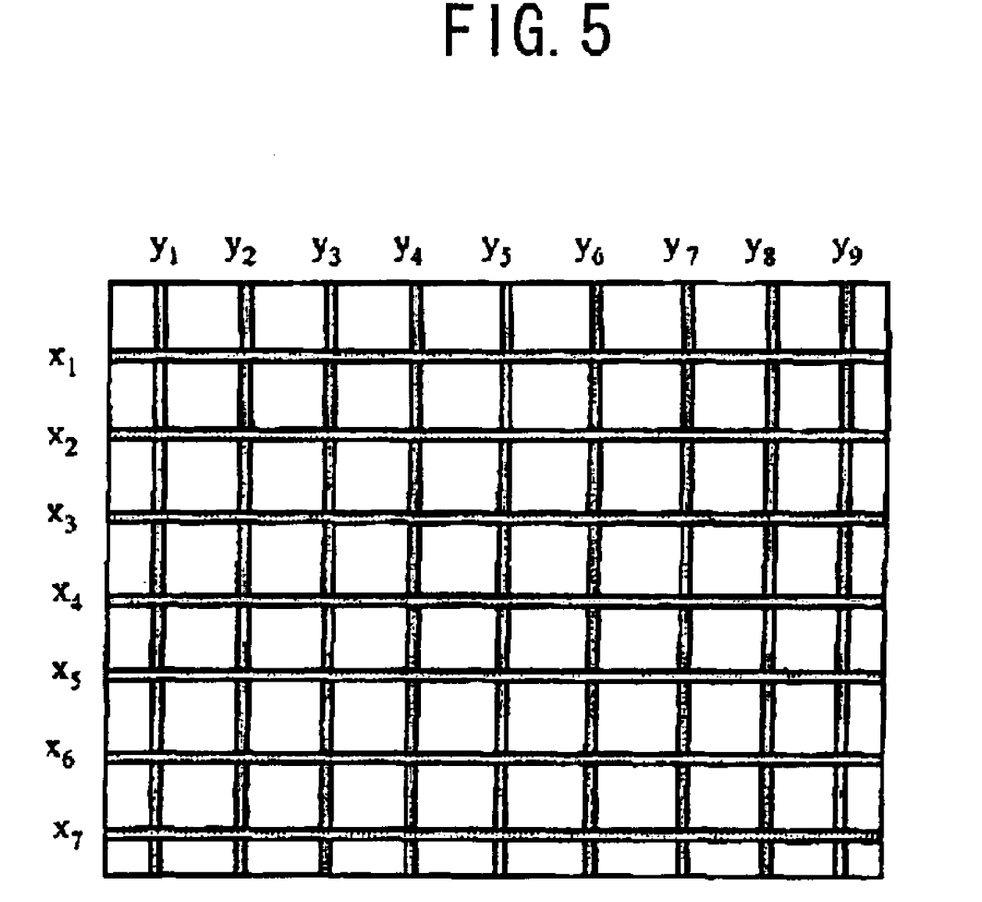
FIG. 5 is a perspective plane view of the display device shown in FIG. 4.

Example 6 will be described with reference to FIG. 4 and FIG. 5. In FIG. 4 and FIG. 5, the same parts are designated by the similar numerals. A counter electrode 2 and an orientation film 4a were provided on a substrate 1a on the side of a first display surface 30. On a substrate 1b on a second display side 35, a pixel electrode 3 of ITO having a pattern corresponding to the configuration of orientation holding means 11 and a switching element 10 were provided. An orientation film 4b was provided on the pixel electrode 3 through an insulating layer. On the other side of the substrate 1b, a transparent recording part 26 was provided in a grid pattern. The thus formed intersections (Xn, Ym) of the rows Xn and columns Ym can be used as readable and writable digital information.

According to the present invention, a liquid crystalline gel composition which can be applied to various types of light control elements is provided. Also, a display medium, a display device and a display body which can be driven by a low voltage and has a high contrast ratio are provided. Moreover, a display medium, a display device and a display body having a digital information recording function are provided. The present invention can be a great contribution to the field of information display using liquid crystal.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

The teachings of Japanese Patent Application No. 2002-060958, filed Mar. 6, 2002, inclusive of the specification, claims and drawings, are hereby incorporated by reference herein.

What is claimed is:

1. A liquid crystalline gel composition comprising a liquid crystalline compound, and a gelling agent having a structural unit represented by formula (1):

(1)

wherein $R_1$ represents a hydrogen atom or an organic group having at least one carbon atom, X represents a divalent organic group having at least one carbon atom, Y represents a divalent hydrocarbon group having at least one carbon atom, $R_2$ represents a hydrogen atom or an organic group having at least one carbon atom, and n is an integer of at least 1.

2. A display medium comprising a first substrate, a second substrate and a layer of a liquid crystalline gel composition according to claim 1 interposed between the first and the second substrate, wherein the first and the second substrate has at least one electrode on said first and second substrate.

3. The display medium as claimed in claim 2, further comprising a protective layer provided on at least a part of the display medium.

4. The display medium as claimed in claim 2, further comprising a print layer provided on at least a part the display medium and/or on at least a part of said protective layer.

5. The display medium as claimed in claim 4 further comprising a print protective layer provided on said print layer.

6. The display medium as claimed in claim 2, further comprising an information recording part.

7. The display medium as claimed in claim 6, wherein said recording part is a recording medium wherein an information is magnetically written on the recording medium and the information is readable from the recording medium.

8. The display medium as claimed in claim 6, wherein said recording part is an integrated circuit memory, a non-contact integrated circuit memory, or an optical memory.

9. The display medium as claimed in claim 6, wherein said recording part is a transparent recording medium wherein an information is optically readable from the transparent recording medium.

10. The display medium as claimed in claim 6, wherein an information is stored in said information recording part and the information indicates the front or back side of said display medium and/or the location thereof.

11. The display device comprising the display medium according to claim 2, and a switching element capable of applying an electric field to said display medium according to an image signal.

12. The display device as claimed in claim 11, further comprising a means for holding a state of said liquid crystalline gel composition created by said switching element.

13. The display device as claimed in claim 11, further comprising a protective layer provided on at least a part of the display device.

14. The display device as claimed in claim 13, further comprising a print layer provided on at least a part of the display device and/or on at least a part of said protective layer.

15. The display medium as claimed in claim 14, further comprising a print protective layer provided on said print layer.

16. Display device as claimed in claim 11, further comprising an information recording part.

17. The display device as claimed in claim 16, wherein said recording part is a recording medium wherein an information is magnetically written on the recording medium and the information is readable from the recording medium.

18. The display device as claimed in claim 16, wherein said recording part is an integrated circuit memory, a non-contact integrated circuit memory, or an optical memory.

19. The display device as claimed in claim 16, wherein an information is stored in said information recording part and the information indicates the front or back side of said display medium and/or the location thereof.

20. The display device as claimed in claim 11, wherein said switching element capable of applying an electric field to said display medium according to an image signal is a thin film transistor.

21. A display body comprising the display medium according to claim 2.

22. The display body as claimed in claim 21, wherein the display body is in the form of a display card, a display sheet, a display panel or a display sign.

23. The display body as claimed in claim 22, wherein said display card, display sheet, display panel or display sign is flexible.

24. A display body comprising the display device according to claim 11.

25. The display body as claimed in claim 24, wherein the display body is in the form of a display card, a display sheet, a display panel or a display sign.

26. The display body as claimed in claim 25, wherein said display card, display sheet, display panel or display sign is flexible.

* * * * *